Patented Aug. 22, 1939

2,170,611

UNITED STATES PATENT OFFICE 2,170,611

METHOD OF IODINE FIXATION AND PRODUCT THEREOF

Douglas S. See, San Mateo, Calif., assignor to Leslie-California Salt Company, a corporation of Delaware No Drawing. Application February 7, 1936, Serial No. 62,809

8 Claims. (Cl. 99—143)

My invention relates to a process by which the iodine content of salt blocks used for stock feeding may be stabilized, and to the product resulting therefrom.

It has long been the practice to cast these blocks in a generally rectangular form, each block weighing about 50 pounds. For the past ten years it has been the practice to add potassium iodide to these salt blocks used for animal feeding because of its beneficial effect on the animals. Where the block was consumed quickly there appeared to be no appreciable loss of the iodine content, but under normal conditions of exposure to sunlight and moisture it was found that a large part of the iodine content was soon lost. For instance, in a sunlight test conducted on several iodine treated blocks of different manufacturers, after six days testing it was necessary to scrape off three and one-half inches of salt before finding any iodine. After thirty days, it was necessary to go down seven inches before striking any iodine. In a wet test on similar blocks, six days of exposure to the atmosphere and spraying for one hour each day, made it necessary to scrape off six inches of salt before reaching any iodine. By the end of the seventh day the block was one-half dissolved and contained no trace of iodine.

These tests truly represented conditions of use of salt blocks and disclosed the problem which it is the object of my invention to solve, namely, a way to stabilize or fix the iodine content of the salt block so that it can withstand exposure to the sunlight and rain and still not lose the iodine content. It appears that the sunlight decomposes the potassium iodide (KI) and passes it off as iodide vapor; and, that the rain and moisture leech it out.

I have discovered that by adding a viscous syrup, such as molasses, to the sodium chloride and potassium iodide mixture, I am able to stabilize the latter.

I have also determined, by test, that viscous sugar syrup compounds of the following classes will act in a similar manner to stabilize the potassium iodide content in the salt blocks:

1. Glucoses or monoses—grape sugar, dextrose, levulose, fructose—$C_6H_{12}O_6$.

2. Saccharoses or bioses—cane sugar, sucrose—$C_{12}H_{22}O_{11}$.

In this specification I shall use the term sugar as including these compounds or their equivalents.

The potassium iodide, being water soluble, may be dissolved in the sugar syrup and then this syrup mixture dispersed throughout the sodium chloride until a homogeneous mass is obtained. The syrup will become saturated with sodium chloride and at the same time hold the potassium iodide in solution. A satisfying result has also been obtained where the potassium iodide was mixed dry with the sodium chloride and then the syrup added.

I have found that about 1% to 2% of the sugar syrup gives a satisfactory result where the potassium iodide content is to be about .02%. The sodium chloride is soluble in the syrup, therefore I want to avoid too much syrup which would make it difficult or impossible for the blocks to retain their shape or soundness.

Since the salt blocks are to be used for feeding stock, the viscous syrup medium must be edible.

The probable explanation of my invention, which I give without prejudice to change, should subsequent work show it to be incorrect, is that there is a physical reaction at least. Sugar syrup is viscous and sticky, and as the potassium iodide is largely dissolved in the syrup, the latter physically holds the potassium iodide against leeching out when wet. Also, the syrup chemically contains several organic acids and acts as a reducing agent.

One method by which I attain these results is to stir the potassium iodide with the viscous syrup until the potassium iodide is dissolved. Then the viscous syrup is homogeneously dispersed throughout the salt mass. The next step is to press the mixture into bricks.

An alternative method is to add the potassium iodide in powdered form to the salt mass. Then the syrup is added and as it is dispersed through the salt mass it appears to take up the potassium iodide.

Usually I add to the mix a small amount (.025%) of iron oxide ($Fe_2O_3$), but this is for its value as an item in animal diet, and for coloring the block so as to distinguish it from the untreated block, and not for its effect on stabilization of the potassium iodide.

Some (about .02%) magnesium chloride is added to the mass as a solution. This is not done for its effect on stabilization of the potassium iodide, and may be omitted. I have found that the magnesium chloride acts to give a harder surface to the block. It attracts moisture, and this will dissolve the sodium chloride which, when drying out will recrystallize and make a harder surface. This is done because the blocks are usually shipped uncrated and unboxed.

The following is an example of my invention given in connection with the commercial manufacture of iodized salt blocks of the fifty pound size: I mix enough materials to make ten fifty-pound blocks at a time. The ingredients are:

495 pounds of dry sodium chloride (NaCl) (approx. 99%)
2½ quarts of black strap molasses (1%)
56 grams of iron oxide ($Fe_2O_3$) (.025%)
50 grams of potassium iodide (KI) (.022%—of which 10% is magnesium carbonate)
1 pint of magnesium chloride (MgCl solution) (.02%)

A hopper is filled with the dry sodium chloride. The iron oxide and potassium iodide are first mixed together and then may be dissolved in the molasses. (Then the magnesium chloride solution, if used, is added at this time or may be poured into the main mixing hopper.) This gives a viscous syrupy mixture. The liquid solution is then dumped into the main mixing hopper where the ingredients are tumbled together until the color is uniform which is taken as an indication of thorough admixing of the ingredients. From here the mixture is taken to a hydraulic press and the fifty pound blocks are pressed out.

Tests conducted simultaneously with those first mentioned revealed that a salt block, made according to my invention, after six days of exposure in a sunlight test showed slight traces of potassium iodide on the surface and a normal content ¼ inch below the surface. The same treated block after thirty days exposure showed slight traces of potassium iodide ¼ inch below the surface and a normal content ½ inch below the surface. This is to be compared with the untreated block in the dry exposure test where at the end of thirty days it was necessary to go down seven inches before reaching any iodine. In the wet tests of the block treated according to my invention, after thirty days of exposure to the atmosphere and spraying at intervals of one hour on the first ten days, it was necessary to scrape off only one-eighth inch to reach a normal iodine content. Contrast this with the untreated block in the wet test where at the end of seven days all trace of iodine was gone.

The present invention accordingly provides an iodized salt block which can be left exposed to the sunlight and rain without giving up its potassium iodide content.

What I claim is:

1. A salt block for animal feeding containing potassium iodide dissolved in a viscous sugar syrup in a ratio of syrup to potassium iodide of between 50 and 100 to one by weight and which mixture is homogeneously dispersed through the mass of NaCl.

2. A salt block containing substantially 98% sodium chloride together with an edible viscous sugar medium in which potassium iodide is dissolved in a ratio of said viscous sugar medium to potassium iodide of between 50 to 100 to one by weight.

3. A new composition of edible matter comprising sodium chloride, potassium iodide and a viscous sugar syrup wherein said potassium iodide and said sugar syrup form approximately 2% by weight of the composition.

4. A new composition of edible matter comprising sodium chloride, potassium iodide and molasses in which the two last-named products constitute approximately 2% of the whole mixture in the ratio of between one hundred (100) and fifty (50) parts of molasses to one part of potassium.

5. As a new composition of matter, a feed block for animals comprising sodium chloride, potassium iodide, and a stabilizer for said potassium iodide in the form of a viscous sugar medium; said stabilizer constituting not to exceed 2% of the total constituents and in the relation of between one hundred (100) and fifty (50) parts to one part of potassium iodide.

6. A salt block for animals comprising sodium chloride, potassium iodide and a stabilizing agent in the form of a sugar syrup for said potassium iodide homogeneously dispersed throughout the block and in which the potassium iodide is held in spite of exposure to light and moisture the said stabilizing agent being present in the ratio of from fifty (50) to one hundred (100) parts to one part of potassium iodide.

7. A salt block for animals comprising sodium chloride, potassium iodide and a stabilizing agent of sugar syrup the last two products by weight comprising approximately 2% of said materials and in the ratio of between fifty (50) and one hundred (100) parts of sugar to one part of potassium iodide.

8. A stabilized salt block suitable for exposure to light and moisture, comprising sodium chloride, potassium iodide, and an amount of viscous sugar syrup not exceeding 2% of the weight of sodium chloride and wherein the sugar syrup is present in the relation of between one hundred (100) and fifty (50) parts to one part of potassium iodide.

DOUGLAS S. SEE.